United States Patent [19]
Johnson et al.

[11] Patent Number: 6,090,173
[45] Date of Patent: Jul. 18, 2000

[54] AIR FILTER ASSEMBLY FOR FILTERING AIR WITH PARTICULATE MATTER

[75] Inventors: Steven A. Johnson, St. Paul; Thomas D. Raether, St. Louis Park; James L. Berkhoel, Woodberry, all of Minn.

[73] Assignee: Donaldson Company, Inc., Minneapolis, Minn.

[21] Appl. No.: 09/130,596

[22] Filed: Aug. 7, 1998

[51] Int. Cl.[7] .................................................. B01D 46/04
[52] U.S. Cl. ........................... 55/302; 55/301; 55/341.1; 55/341.2; 95/280
[58] Field of Search ......................... 55/302, 301, 341.1, 55/341.2; 95/280

[56] References Cited

U.S. PATENT DOCUMENTS

| | | |
|---|---|---|
| 3,394,532 | 7/1968 | Oetiker . |
| 3,499,268 | 3/1970 | Pausch . |
| 3,509,698 | 5/1970 | Medcalf et al. . |
| 3,874,857 | 4/1975 | Hunt et al. . |
| 3,942,962 | 3/1976 | Duyckinck . |
| 4,171,963 | 10/1979 | Schuler . |
| 4,218,227 | 8/1980 | Frey . |
| 4,251,244 | 2/1981 | Evenstad . |
| 4,272,262 | 6/1981 | Britt et al. . |
| 4,278,454 | 7/1981 | Nemesi . |
| 4,292,057 | 9/1981 | Ulvestad et al. . |
| 4,306,893 | 12/1981 | Fernando et al. . |
| 4,395,269 | 7/1983 | Schuler . |
| 4,504,288 | 3/1985 | Kreft . |
| 4,578,092 | 3/1986 | Klimczak . |
| 4,632,680 | 12/1986 | Klimczak . |
| 4,820,320 | 4/1989 | Cox . |
| 4,909,813 | 3/1990 | Eggerstedt . |
| 4,955,996 | 9/1990 | Edwards et al. . |
| 5,002,594 | 3/1991 | Merritt ..................................... 55/302 |
| 5,062,867 | 11/1991 | Klimczak ................................ 55/302 |
| 5,062,872 | 11/1991 | Williams ................................ 55/302 |
| 5,062,873 | 11/1991 | Karlsson ................................. 55/302 |
| 5,393,327 | 2/1995 | Chambers et al. ....................... 55/302 |
| 5,421,845 | 6/1995 | Gregg et al. ............................. 55/302 |
| 5,562,746 | 10/1996 | Raether . |

FOREIGN PATENT DOCUMENTS

| | | |
|---|---|---|
| 0 123 721 A1 | 11/1984 | European Pat. Off. . |
| 1016556 | 12/1964 | United Kingdom . |

Primary Examiner—David A. Simmons
Assistant Examiner—Minh-Chau T. Pham
Attorney, Agent, or Firm—Merchant & Gould P.C.

[57] ABSTRACT

A method of cleaning a filter element includes discharging a quantity of pressurized air from a blow pipe into a Venturi element in air flow communication with a filter element to provide a positive cleaning pressure differential along greater than 95% of a length of the filter element. In one arrangement, an air filter assembly for accomplishing this method comprises a housing, a first filter construction, a first Venturi element, and a pulse jet cleaning system including a blow pipe. The blow pipe and the Venturi element are constructed and arranged to provide a positive cleaning pressure differential along greater than at least 75% of the length of the filter media within the element. In one embodiment, the Venturi element is described as including a specially formed contoured section in the throat portion of the element.

19 Claims, 12 Drawing Sheets

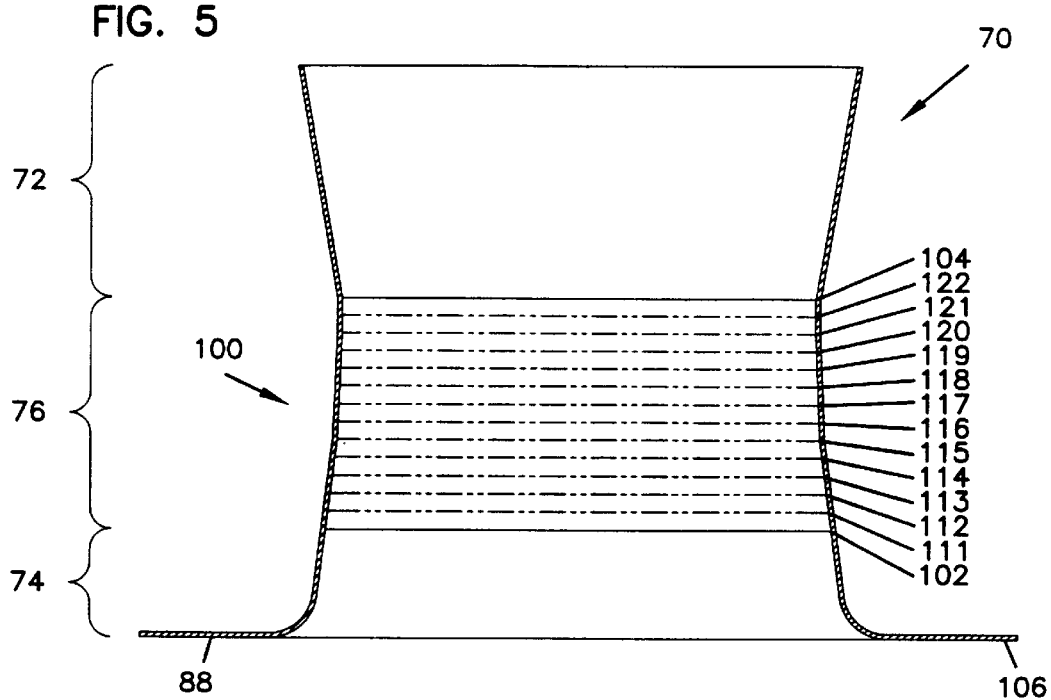
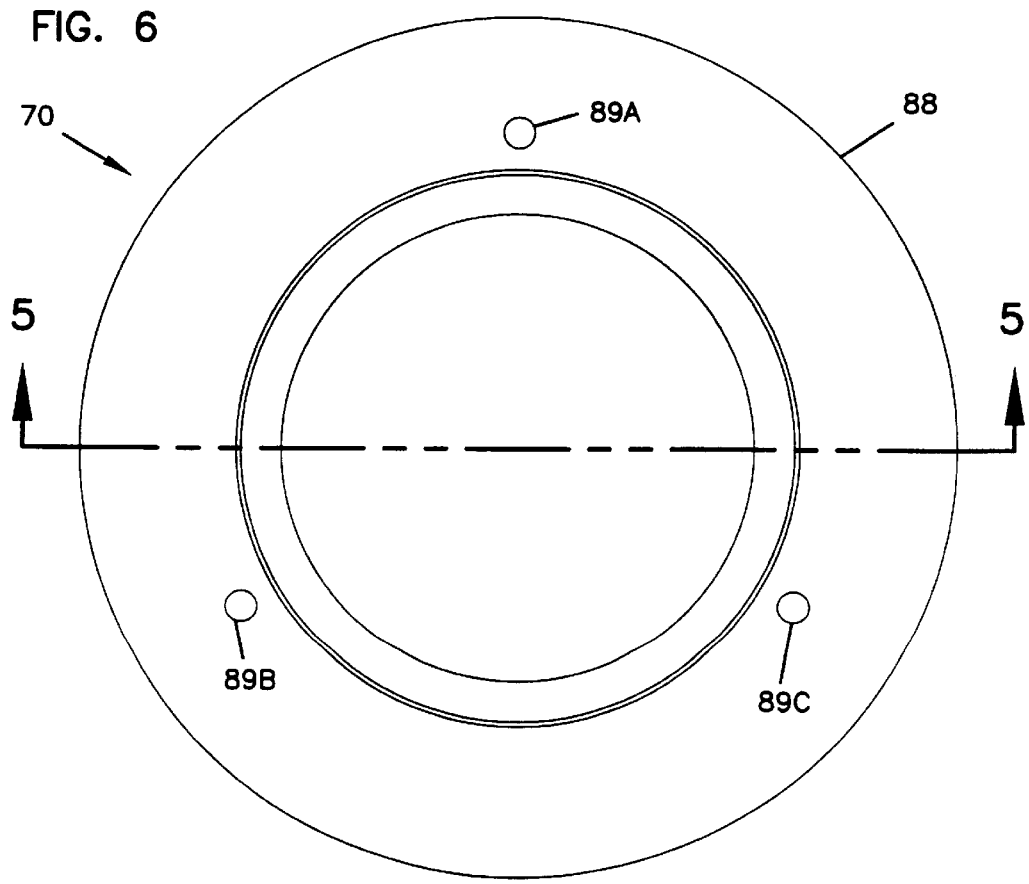

AIR FILTER ASSEMBLY FOR FILTERING AIR WITH PARTICULATE MATTER

FIELD OF THE INVENTION

The present invention is related to air filtering systems having Venturi elements and methods of using systems equipped with Venturi elements.

BACKGROUND OF THE INVENTION

Particular matter suspended in a gas is encountered in many industries. In some industries, such particulate matter is a valuable product, for example, starch, that is to be recovered. For others, such as the metal working industry, the particulate matter may be simply dust to be removed from the air. Systems for cleaning an air or gas stream laden with particulate matter include air filter assemblies that have filter elements disposed in a housing. The filter element may be a bag or sock of a suitable fabric or pleated paper. Cleaning is accomplished by periodically pulsing a brief jet of pressurized air into the interior of the filter element to reverse the air flow through the filter element. Such air filter assemblies are disclosed in, for example, U.S. Pat. No. 4,218,227 (Frey) and U.S. Pat. No. 4,395,269 (Schuler), which patents are hereby incorporated by reference.

Venturi elements are sometimes used to direct the jet of pressurized air into the filter element and to recover pressure energy as air exits the filter element. Often, the inlet end of the Venturi element is either outside the filtering chamber or extends into the interior of the filter element. For example, U.S. Pat. No. 4,218,227 (Frey) discloses mounting a Venturi with the inlet of the Venturi element resting on the side of the partition of the filter chamber opposite the filter element. U.S. Pat. No. 3,942,962 (Duyckinck) discloses a Venturi element with the Venturi inlet portion extending into the interior of the filter element.

In a standard design of Venturi systems for application with pulse-jet-cleaning, a high pressure drop (or pressure differential) occurs across the Venturi element. Pulse-jet cleaning systems generate loud noise as the back-pulse valves open and close to deliver the highly pressurized air necessary to overcome the pressure in the filter element for reversing the flow of air therein. U.S. Pat. No. 5,562,746 to Raether describes, among other things, an air-filtration system that results in reduced noise level and lower energy loss during the filtration of particulate matter-laden air and pulse-jet cleaning of the filter elements. U.S. Pat. No. 5,562,746 is hereby incorporated by reference.

SUMMARY OF THE INVENTION

In one aspect, the disclosure describes a method of cleaning a filter element. The method includes a step of discharging a quantity of pressurized air from a blowpipe into a Venturi element in air flow communication with a filter element. This provides a positive cleaning pressure differential along greater than 95% of a length of the filter element.

In another aspect, the disclosure describes an air filter assembly for accomplishing the above method. One arrangement described comprises a housing, a first filter construction, a first Venturi element, and a pulse jet cleaning system including a blowpipe. The blowpipe and the Venturi element are constructed and arranged to provide a positive cleaning pressure differential along greater than at least 75% of the length of the filter media within the element.

The disclosure describes one embodiment of the Venturi element as including a specially formed contoured section in the throat portion of the element. The contoured section of the throat portion includes at least 12 regions of decreasing diameter.

BRIEF DESCRIPTION OF THE DRAWINGS

FIG. 3 is a front elevation view of the air filtration system depicted in FIG. 2.

FIG. 4 is a perspective view of a portion of a mounting arrangement utilized in the air filtration system of FIGS. 1–3.

FIG. 5 is a side view of an embodiment of the Venturi element utilized in the air filtration system of FIGS. 1–3.

FIG. 6 is an end view of the Venturi element shown in FIG. 5 viewed from the distal end thereof.

DETAILED DESCRIPTION OF THE PREFERRED EMBODIMENT

Figure 1:
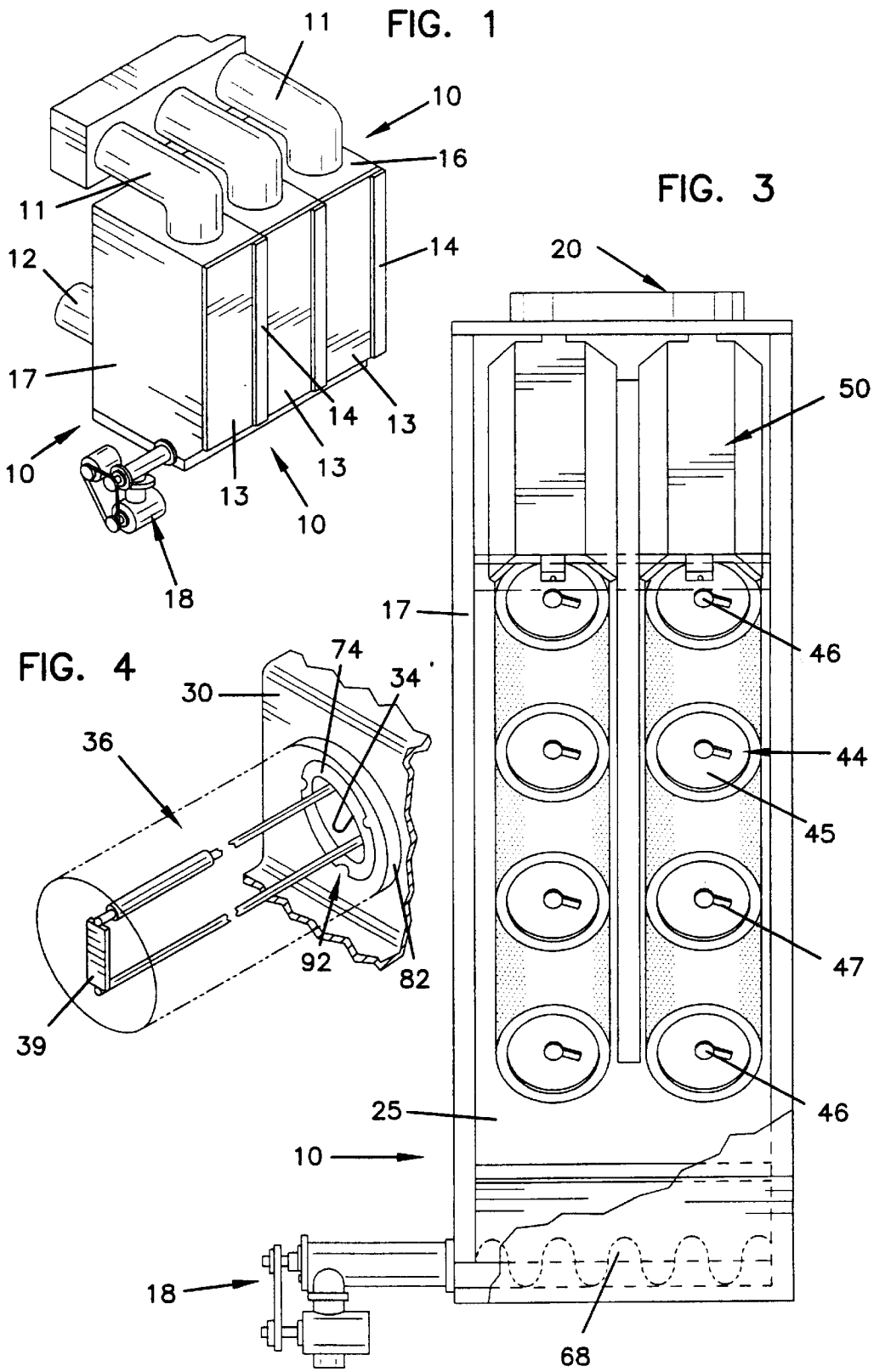
FIG. 1 is a perspective view of one type of operational installation of an air filtration system having filter elements equipped with Venturi elements according to the present invention.

Referring to FIG. 1, an air filtration system or assembly is depicted generally at 10. The system 10 depicted is shown with three units or modules configured together in side-by-side arrangement. This arrangement can be, for example, of a size that fit into a 6 feet by 10 feet by 10 feet space.

Each module in FIG. 1 includes a conduit 11 for venting dirty or contaminated air (i.e., with particulate matter) into the filter assembly. A like conduit 12 is provided for venting clean or filtered air from the filter assembly. A front access door 13 and a secondary access door 14 are also provided to permit access to the interior of the module for purpose of, for example, maintenance.

Also shown in FIG. 1 is a motor and chain drive assembly 18 of standard construction for operation of an auger screw in the base portion of the assembly.

Figure 2:
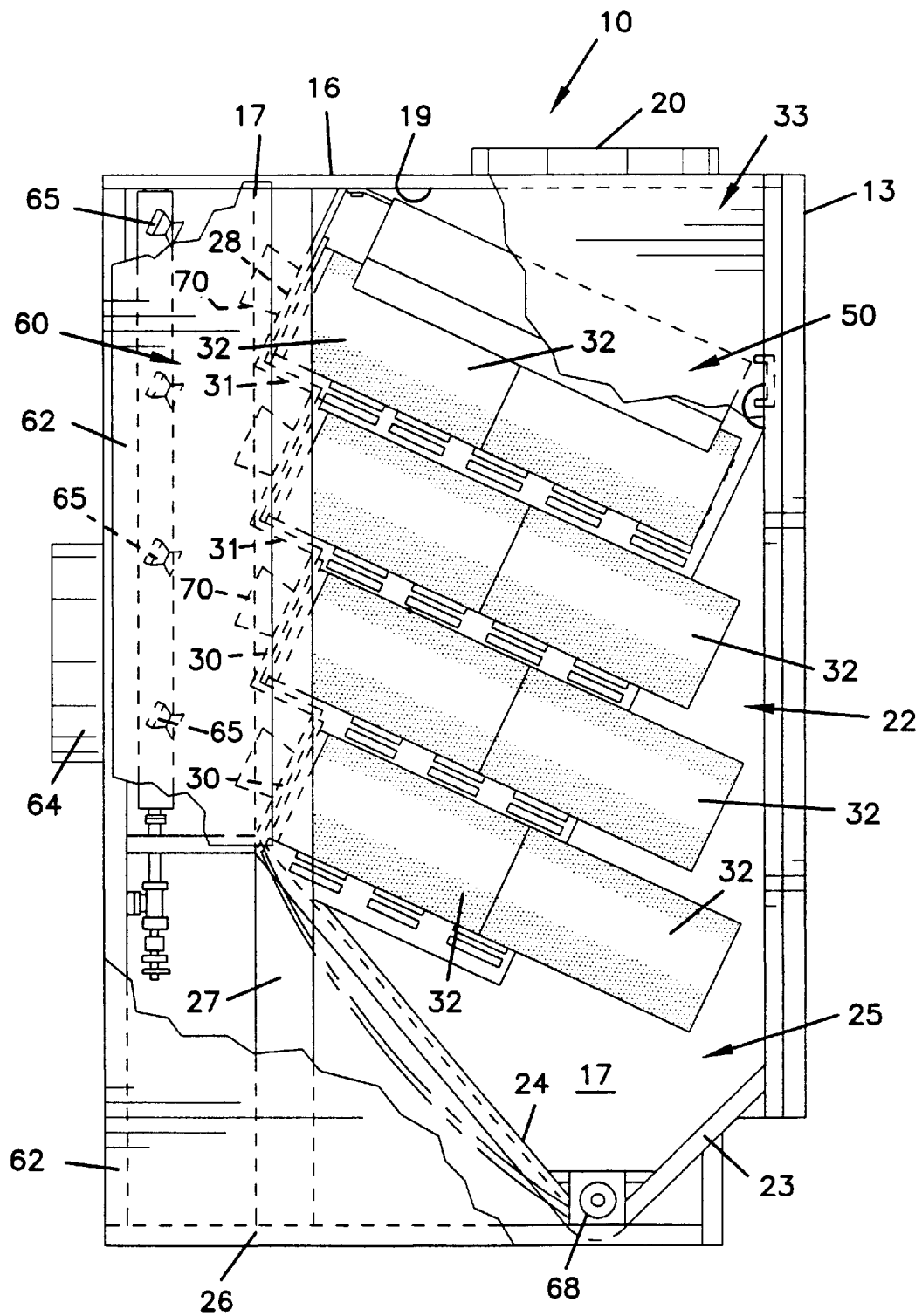
FIG. 2 is a side elevation, partially broke n away, view of one embodiment of the air filtration system of FIG. 1 utilizing Venturi elements according to the present invention.

Referring now to FIG. 2, the present invention is shown in side elevation with one side wall panel 17 being broken away to illustrate the arrangement of the various elements of the assembly. The upper wall panel 16 has an inner wall surface 19. In this embodiment, the air inlet is positioned in the upper wall panel so that entering dust-laden air or other contaminated fluid is introduced in a downwardly direction into the dirty air chamber 22. This allows the assembly to utilize the forces of gravity in moving the dust through the assembly 10 to the collection area. The dirty air chamber 22 is defined by the door 13, the upper wall panel 16, two pairs of opposing side wall panels 17 which extend downwardly from the upper panel, stepped wall structure 28, and a pair of sloping surfaces 23, 24. The sloping surfaces 23, 24 partially define a collection area or hopper 25 within the base portion of the assembly. A bottom base panel or frame 26 is sealed to the side wall panels 17 in any suitable, standard manner. Also, the dirty air chamber 22 is a sealed chamber in order to prevent any escape of contaminated air or fluid prior to its being filtered.

Sealed to a structural frame member 27 along each of the side wall panels 17 is mounted a spacer wall or tube sheet structure 28 having a step-like design to which are mounted the separate filter elements 32 of the assembly. The tube sheet structure 28 is sealed on all four sides to hermetically seal the dirty air chamber 22 from a clean air chamber 60. The structure 28 in the preferred embodiment has three steps or indented portions. Each step portion includes an upwardly extending back member 30 and a leg member 31 extending at right angles therefrom. The tube sheet structure 28 is preferably constructed from a single piece of sheet steel and thus the individual step portions are continuous extensions of the step portion immediately above it and below it. As shown in FIGS. 2 and 3, the filter elements 32 mounted to the stepped, tube sheet structure 28 are positioned in the dirty air chamber 22 in stepped or spaced apart, partially overlapping relationship, in a generally downward direction at an acute angle of inclination with respect to the horizontal plane of the upper surface panel 16. In this manner, a distribution space 33 is defined in the uppermost portion of the filter assembly 10 by the inclined baffle 50, the side wall panels 17, the upper wall panel inner surface 19, and front access door 13. As the dirty air enters the assembly 10 from the inlet 20, it is received into the distribution space 33 prior to its being filtered.

The individual filter elements 32 are pleat media formed into cylindrical tube elements each having ends. The construction of the filter media portion of each element and how it is supported to the tube sheet structure 28 is similar to the filter element of U.S. Pat. No. 4,395,269 and U.S. Pat. No. 5,562,746. Details of construction of the filter element and how the filter media is fashioned into stable cylindrical shape and confined with end caps as disclosed in U.S. Pat. No. 4,171,963 (Schuler) are incorporated by reference herein. The support assembly for supporting the filter element is shown in FIG. 4. A portion of a back member portion 30 of the tube sheet structure 28 has an opening (not shown in FIG. 4, but shown in FIG. 7) through which is disposed the Venturi element 70. A yoke assembly 36 is used for supporting the filter element 32. The yoke assembly can have steel rods extending through the interior of the Venturi element 70 and welded to the tube sheet structure 28 on the side (not shown) in the clean air chamber. Alternatively, although not shown in the figures, steel rods of the yoke assembly can be threaded at the proximal end and extend through the notches 92 in the Venturi bell-mouthed-portion and the apertures 89 in the flange 88 of the Venturi element 70 described below. In such a case, a rod can be structured so that it can be secured to the tube sheet structure 28 together with the flange 88 of the Venturi element 70 by a nut placed on the clean air chamber side of the tube sheet structure. This can be achieved in a variety of ways. For example, the rod can have an integral annular ridge proximate its proximal end to act a stop as the proximal end of the rod is extended through an aperture of the tube sheet structure 28 to be fastened with a nut. This arrangement has the advantage that no rod extends through the throat of the Venturi element 70. Another practicable alternative for securing the filter element to the tube sheet structure 28 is one similar to the arrangement disclosed in U.S. Pat. No. 4,218,227 (Frey).

The media of the cylindrical tube element in the filter element 32 is confined in end caps (or collar member) at both ends. Generally, the portion of the media covered by the end caps are not considered porous to air as it is shielded by the end cap. The proximal end cap 82 rests on a gasket 84 disposed between the proximal end cap and the tube sheet structure 28. By pressing the filter element 32 toward the tube sheet structure 28 and compressing the gasket 84, the proximal end cap 82 is sealed to the tube sheet structure to prevent air leakage.

In the embodiment shown, each yoke assembly is secured perpendicularly to the tube sheet structure so as to suspend the filter elements at an acute angle with respect to the horizontal. The preferred range for the angle of inclination of the filter elements is from 15°–30° from the horizontal, although the system can work with angle of inclination to be a variety of angles, including no angle. Each yoke assembly 36 in the invention is constructed similarly. In the embodiment shown, two parallel vertical rows of two filter elements each are provided. Each step portion of the tube sheet structure thus has two spaced apart yoke assemblies mounted to its back member 30.

FIGS. 2 and 3 taken in combination illustrate the placement of a pair of filter elements 32 onto each yoke assembly 36. An annular distal end cap 44 having a dish portion 45 and a centrally located opening is aligned with the end plate 39 so as to sealingly cover the outboard end of the second filter element of each pair. This allows the removable attachment of a clamping arrangement for axially compressing the gaskets (not shown in FIGS. 2–3) of the filter elements 32 to seal them to the tube sheet structure 28 as well as to each other. Also, the fastening bolt 46 with its special handle 47 is inserted through the aligned apertures of the end plate 39 and end cap 44 to secure the two together.

Directly behind the tube sheet structure 28 is located the clean air chamber 60 which is defined by the back surface panel 62 of the assembly and a portion of the upper surface panel 16, a portion of the two opposing side panels 17, and the back side of the tube sheet structure 28. Mounted in the back surface panel 62 is a clean air outlet 64 for venting the clean, filtered air into the conduit 12 of return to the plant environment. A system for cleaning each yoke assembly and the filter elements is also provided in the clean air chamber 60. Preferably, the system includes a plurality of pulse type valves 65 and nozzles or blow pipes 97. A valve and blow pipe arrangement is positioned directly in line with an outlet opening 34 in the tube sheet structure 28 so as to direct a jet of compressed air into the hollow interior of a pair of filter elements 32. The type of pulse type valves (or back pulse valves), blow pipes, piping arrangement to provide pressurized air, and their control and operation are known in the art.

Figure 7:
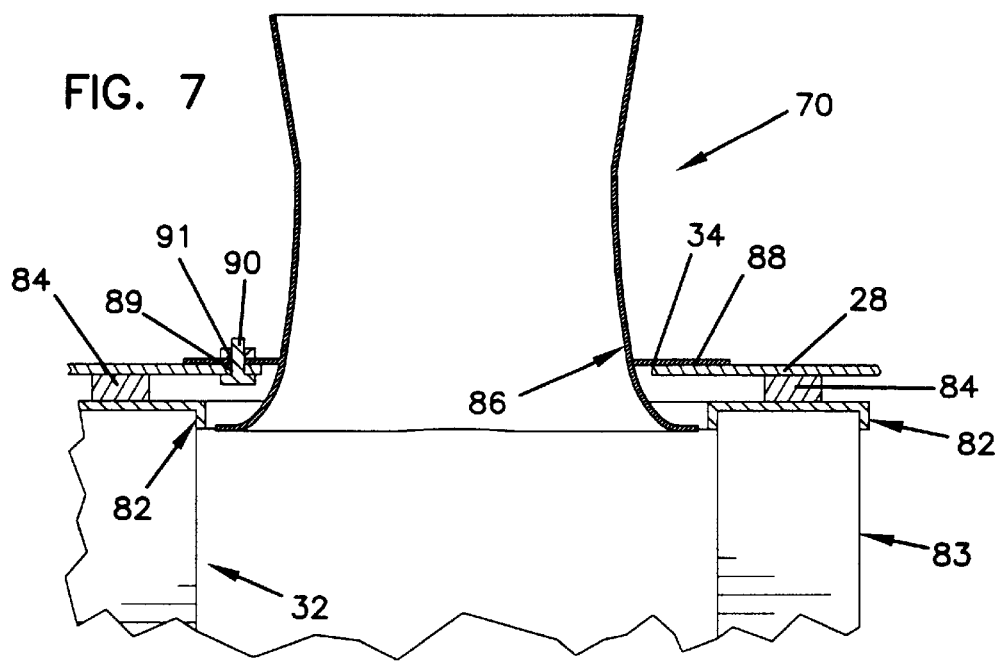
FIG. 7 is a partial cross-sectional view of an embodiment of a Venturi system of the present invention having a Venturi element shown in FIG. 6, showing the cross-sectional view of the Venturi element taken along the line 6—6.

Referring to FIGS. 5–7, mounted on the tube sheet structure 28 are Venturi elements 70. Each Venturi element preferably includes an inlet bell-mouth-shaped portion (or Venturi inlet portion) 74, and a contoured throat portion 76. In some preferred embodiments, there is a diffuser portion (or Venturi outlet portion) 72. The contoured throat portion 76 is interposed between and interconnects the diffuser portion 72 and the Venturi inlet portion 74. Air exits the Venturi element 70 through the diffuser into the clean air chamber when air is filtered and passes through the filter element 32 from the filtering chamber 22 in a normal filtration air flow pattern (i.e., no pulsing). The diffuser portion 72 preferably has diverging (or flaring), essentially straight walls to facilitate pressure recovery during the normal filtration condition. The contoured throat portion 76 is generally concave in the direction toward the interior thereof.

The Venturi element 70 is positioned on the tube sheet structure 28 in relation to the filter element 32 such that the Venturi inlet portion 74 is disposed in the clean air chamber 60. As shown in FIG. 7, the Venturi inlet portion 74 has a distal end that is proximate to and is aligned such that it is generally at the same crosswise level with the most proximal point of the filter element 32 that is porous to air (i.e., not covered by the proximal end cap (or collar member) 82. In this way, air that passes through the proximal part of the air-porous portion 83 of the filter element 32 travels to the Venturi element 70 along a generally straight path and is unobstructed between the filter element 32 and the Venturi element. Such unobstructed movement of air along a generally straight path reduces resistance to air flow and energy loss. Also shown in FIG. 7 is a gasket 84 for sealing the filter element 32 to the tube sheet structure 28.

In certain prior art systems, the pulse-jet cleaning system does not adequately provide a positive cleaning pressure differential along the entire length of the air-porous portion 83, e.g. the filter media. It has been found that in certain prior art systems, no more than about 75% of the length of the extension of filter media has a positive cleaning pressure differential created therethrough by the pulse-jet cleaning system. Generally, about the first 25% of the length of the media 83 closest to the tube sheet structure 28 does not adequately receive the pulse of air from the pulse-jet cleaning system. The result of this is that a mound of dust accumulates near the end of the filter elements 32 that are nearest the tube sheet 28, whereas the remaining area of filter elements are without free-standing accumulated dust. The parts of the filter elements 32 that accumulate dust pass very little air flow. This loss of air flow causes an increase in the system pressure drop, and a reduction in the overall air flow of the system. This loss of air flow leads to a reduction of the life of filter elements 32. In order to regain this air flow, in the prior art, either the accumulated dust on the filter elements had to be removed by manually removing the elements 32 from the dust collector 10, or more typically, a new, clean replacement filter element 32 would be installed. The construction and arrangement of the present invention helps to overcome the problems of the prior art. In particular, the structure and arrangement of the air filter assembly of the present invention provides a positive cleaning pressure differential along greater than 75% of the length of the filter media 83. In preferred systems, the present invention results in a positive cleaning pressure differential along greater than 85% of the length of the extension of filter media 83. Indeed, in most preferred systems, the present invention results in a positive cleaning pressure differential along greater than 90%, more particularly, greater than 95%, and up to 100% of the length of the extension of filter media 83.

In accordance with the invention, the contour of the throat section 76 and the distance that the pulse-jet blow pipe 97 is from the throat portion 76 of the Venturi is judicially selected in order to result in a positive cleaning pressure differential along substantially all of the length of the filter media 83. Attention is again directed to FIG. 5. In FIG. 5, a cross-section of the Venturi element 70 is illustrated. The throat portion 76 of the Venturi element 70 includes a specially formed contoured section 100. Contoured section 100 includes a first end 102 and an oppositely disposed second end 104. In the preferred contoured section 100 shown, the contoured section 100 decreases in diameter from the first end 102 to the second end 104. The second end 104 corresponds to the point of smallest diameter of the Venturi 70. As such, the second end 104 also corresponds to the throat. The second end 104 or throat defines a continuous and non-differentiable point between the contoured section 100 and the diffuser portion 72. Second end 104 is defined by two converging sections that have different slopes as they converge. While it is continuous between the contoured section 100 and diffuser portion 72, because of the different slopes converging in on second end 104, second end 104 defines a point of non-differentiation.

Preferably, the contoured section 100 has a length of between 2.8–3.2 inches, preferably 3.0 inches. Preferably, the first end 102 has a diameter of about 6.9 inches, specifically about 6.901 inches. Preferably, the second end 104 has a diameter of about 6.5 inches, specifically about 6.510 inches.

Venturi element 70 defines a base line 106 at the outer edge of the inlet portion 74. Preferably, the first end 102 of the contoured section 100 is spaced a distance of about 1.5 inches from the base line 106. Preferably, the second end 104 of the contoured section 100 is spaced a distance of about 4.75 inches from the base line 106.

In preferred embodiments, the contoured section 100 includes a plurality of regions between the first and second ends 102, 104. These regions include, in general, a portion where as each region becomes distanced further from the base line, it defines a diameter that is decreased by an amount less than the region preceding it was decreased in diameter. That is, in the first portion of the contoured section 100, as each region gets further away from the base line, the diameter that region defines is closer to the diameter of the next furthest region from the base line than it is to the diameter of the next closest region to the base line. In this first portion of the contoured section, there are at least 9 regions. In the second portion of the contoured section 100, there are at least three additional regions. Therefore, in the contoured section 100, there are at least 12 regions identified between the first and second ends 102, 104. It has been found that the following dimensions (+/−0.06 inches) for contoured section 100 are preferred:

TABLE 1

| Ref. No. | Distance from base line 106 (in.) | Diameter (in.) | Difference (in.) |
|---|---|---|---|
| 102 | 1.500 | 6.901 | |
| 111 | 1.750 | 6.828 | 0.073 |
| 112 | 2.000 | 6.764 | 0.064 |
| 113 | 2.250 | 6.715 | 0.049 |
| 114 | 2.500 | 6.672 | 0.043 |
| 115 | 2.750 | 6.638 | 0.034 |
| 116 | 3.000 | 6.606 | 0.032 |
| 117 | 3.250 | 6.576 | 0.030 |
| 118 | 3.500 | 6.549 | 0.027 |
| 119 | 3.750 | 6.533 | 0.016 |
| 120 | 4.000 | 6.520 | 0.013 |
| 121 | 4.250 | 6.519 | 0.001 |
| 122 | 4.500 | 6.512 | 0.007 |
| 104 | 4.750 | 6.510 | 0.002 |

As can be seen then from these preferred data, the first portion of contoured section 100 corresponds to the 10 regions 111–120. The second portion of the contoured section 100 corresponds to regions 121 and 122. Regions 111–120 each has a diameter that is smaller than the diameter that precedes it in proximity to the base line 106. Further, each of the regions 111–120 has a diameter that is closer to the diameter of the region that is the next furthest away from the base line 106 than the region that precedes it to base line 106. The second portion defined by regions 121 and 122 vary from the pattern defined by the first portion. For example, the diameter of region 121 is only 0.001 inch difference from the diameter of region 120. The diameter of region 122 is 0.007 inch difference from the diameter of region 121. If one then compares the diameter of region 122 to the diameter of the second end 124, the difference is 0.002 inch. At the opposite end, the difference between the diameter of the first end 102 and the first region 111 is 0.072 inch.

As explained below in the experimental section, the Venturi element 70 with above preferred dimensions results in a system that provides a positive cleaning pressure differential along substantially all of the length of the filter media 83. In addition, in combination with a judicious selection of the distance of the pulse-jet blow pipe from the throat or second end 104 of the contoured section 100 of the Venturi 70, performance is enhanced even further.

Figure 8:
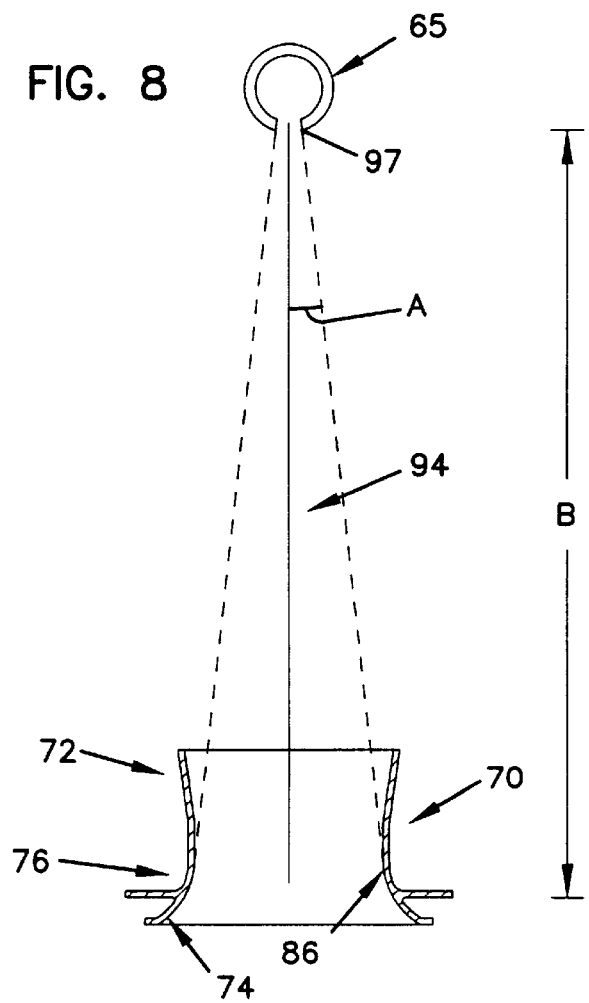
FIG. 8 is a plan view of the pulse-jet-cleaning means and the Venturi element.

Attention is directed to FIG. 8. In FIG. 8, the nozzle or blow pipe 97 of the pulse-jet system is shown schematically spaced a distance away from the Venturi element 70. The nozzle or blow pipe 97 has an outlet aperture 97, that is illustrated in the drawing. As air exits through the aperture 97, an asymmetric jet of air is fully turbulent and behaves as a wall-free shear flow. For this class of air flow, the velocity profile spreads out as the jet exits the blow pipe and travels against the incoming air stream as shown at item A in FIG. 8. Venturi element 70 more effectively allows this jet of air flow to enter the filter elements 32 for at least two reasons. The first reason deals with losses, and the second reason with air flow distribution. In particular, Venturi element 70 allows a continuous path for the jet of air to follow as it enters the filter elements 32. This continuous path reduces air flow separation and, thus, minimizes the irreversibilities that exist in this class of flow. Prior to entering the Venturi 70, the turbulent jet of air flow is pulling in the surrounding air flow inward by frictional effects, in a process called entrainment. With Venturi element 70, this additional entrained air has a smooth path to enter the filter elements 32 with a minimum of frictional and separation losses imparted onto it. Secondly, the shape of the contoured portion 100 of the Venturi element 70 affects the expansion, and thus the distribution, of the jet as it travels into the filter elements 32. The pulse pressure distribution within the filter elements 32 is believed to be a function of the shape of the contoured section 100.

In prior art systems, the axial distance between the blow pipe 97 and the base line 106 has been less than about 20.6 inches, specifically less than about 20.59 inches. It has been found that if the blow pipe 97 is spaced a distance of greater than about 20.6 inches from the base line 106, improved pulse jet cleaning results. Specifically, a positive cleaning pressure differential along greater than 75% of the length of the extension of filter media 83 results. As explained below in the experimental section, one particular preferred distance between the blow pipe 97 and the base line 106 is about 22.6 inches. This results in a positive cleaning pressured differential along substantially the entire length of the extension of filter media 83.

While a diffuser portion 72 is shown with the Venturi element 70, it does not affect the positive cleaning pressure differential along the length of the filter media 83. But, the pressure losses imparted to the airstream as the air flows into the clean air chamber from the tube sheet aperture 34 during the normal filtration air flow pattern will be increased by eliminating or truncating the length of the diffuser portion 72 of the Venturi element.

Referring to FIGS. 5–7, the Venturi element 70 has a system for mounting on the tube sheet structure 28. The system for mounting can be, for example, a tab (not shown) or a flange 88 extending outwardly in a plane substantially perpendicular to the axis of the Venturi element proximate the inlet portion 74 on the exterior surface thereof. The flange 88 can correspond with or be even with the distal end of the inlet portion 74. The flange 88 can have apertures 89 (e.g. three as shown in FIG. 6 at 89A, 89B, 89C) for receiving fasteners such as a bolt 90 to pass therethrough for fastening to the tube sheet structure 28 in corporation with a nut 91. The embodiment of FIGS. 5 and 6 preferably include a Venturi element constructed of steel. Alternatively, the mounting system may include an intermediate flange, such as that described in Raether U.S. Pat. No. 5,562,746.

Figure 16:
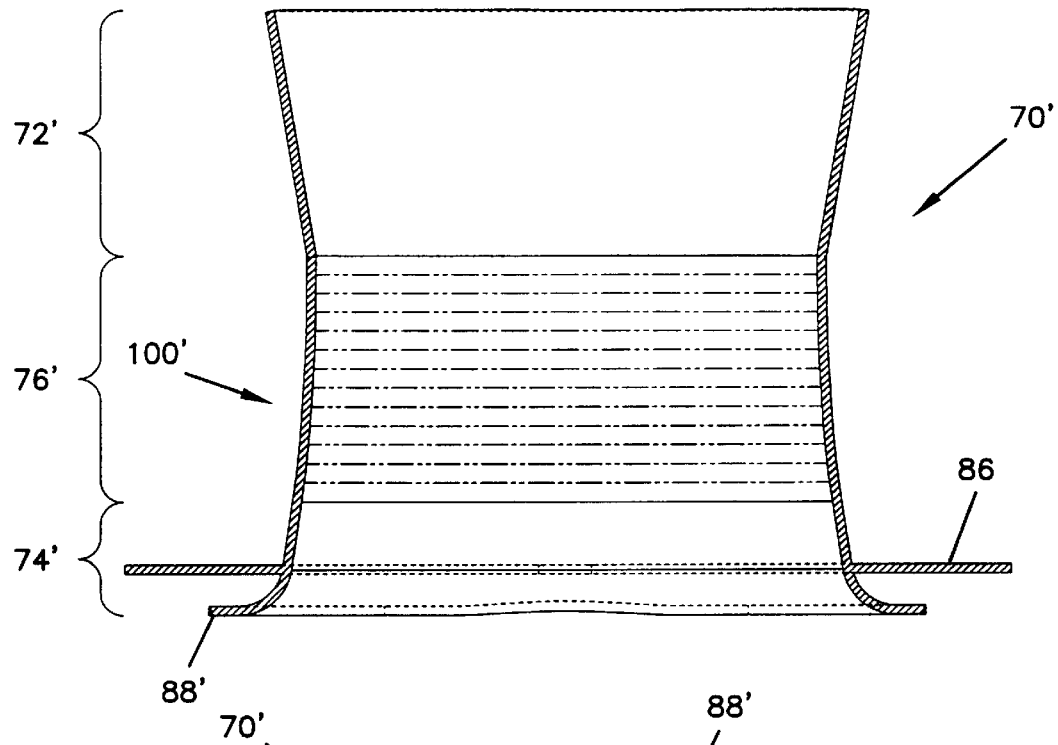
FIG. 16 is a side view of an alternate embodiment of a Venturi element, analogous to the view shown in FIG. 5.
Figure 17:
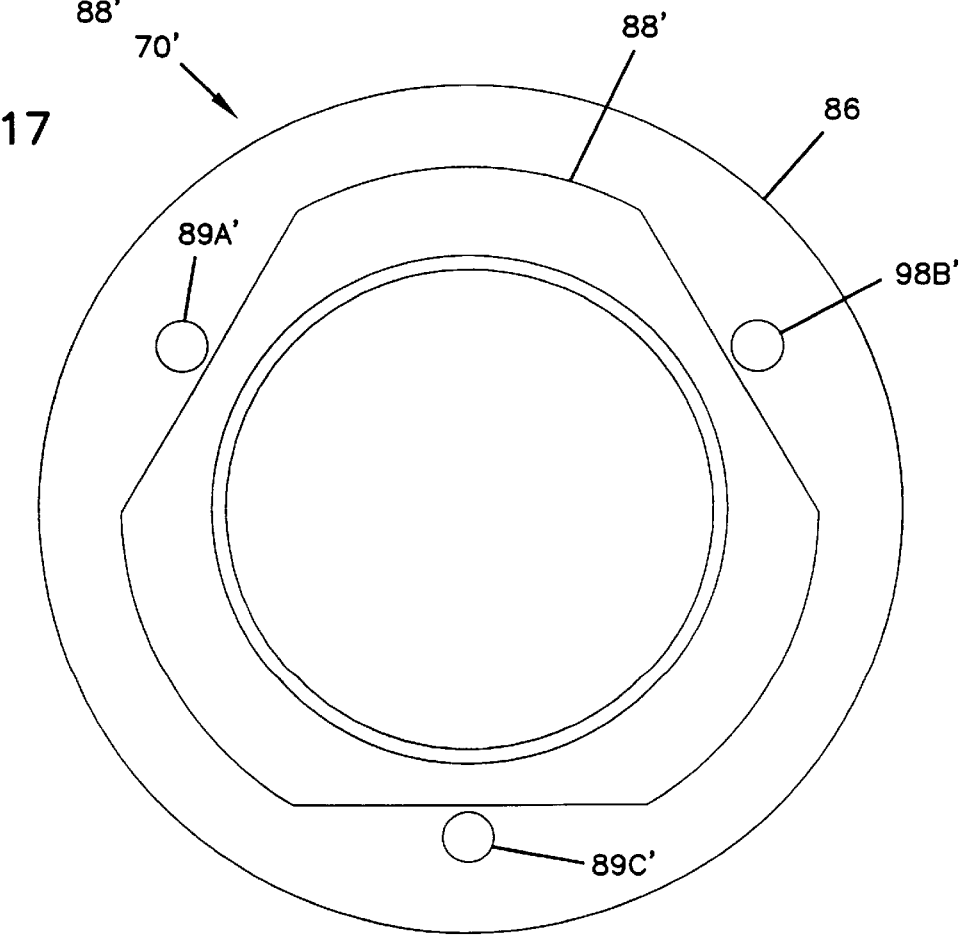
FIG. 17 is an end view of the Venturi element shown in FIG. 16, analogous to the view shown in FIG. 6.

Attention is directed to FIGS. 16 and 17. In this embodiment, the Venturi element 70' includes a contoured throat portion 76' having a contoured section 100', an inlet portion 74', and a diffuser portion 72'. In addition, Venturi element 70' includes a flange 86, as described in U.S. Pat. No. 5,562,746. FIG. 17 shows flange 86 as defining apertures 89A', 89B', and 89C'. Contoured portion 100' has the dimensions as defined in Table 1. Preferably, the Venturi element 70' of FIGS. 16 and 17 is constructed of plastic.

Referring to FIG. 2, the air filter assembly has a bottom-most portion 25 in the dirty air chamber 22 that is substantially similar to that disclosed in U.S. Pat. No. 4,395,269. Such a bottommost portion 25 has two sloping surfaces 23, 24, one of which can act as a diaphragm to movably response to the pressure differentials created within the dirty air chamber by the operation of the pulse-jet-cleaning means. An auger screw 68 is present at the intersection of the two sloping surfaces extending fully through the lowermost portion 25 of the dirty air chamber 22 for removal of particulate matter collected in the dirty air chamber 22 to a location exterior to the air filter assembly.

Although the embodiment with an inclining arrangement of filtering elements and a sloping diaphragm-like surface that moves in response to pressure differentials caused by pulse-jet cleaning is disclosed, the Venturi system of the present invention can be applied to air filter assemblies with, for example, a vertical filter element, a particulate collection system without a diaphragm-like surface, or a system without auger.

Operation

Air or other particle laden gaseous fluid can be driven into the filtering chamber 22, through the air inlet 20 and the filtering elements 32, and from the clean air chamber 60 to the outlet 64 of the filter assembly in the preferred embodiment of the present invention in a manner substantially similar to that described in U.S. Pat. No. 4,395,269, which description of operation has been incorporated by reference.

After a predetermined interval of filtering, the filter elements 32 will become coated with dust and other particulate matter and must be cleaned. Each of the filter elements 32 is pulse-jet-cleaned by its respective quick-acting valve 65 (i.e. back-pulse valve) and blow pipe 97 that discharges a quantity of pressurized air from the exit of the blow pipe 97 toward and into the diffuser portion 72 of the Venturi element 70. As shown in FIG. 8, preferably the angle of divergence, A, of the air jet 94 from the blow pipe 97 is selected so that the air jet is focused into the interior of the diffuser portion 72, more preferably proximate the throat to facilitate the aspiration of secondary air (i.e., air from the clean air chamber) into the filter element 32.

The uppermost filter elements are cleaned first with cleaning of the remaining elements occurring from top to bottom in the assembly. Dust blown off of the upper filter elements is carried downward by gravitational settling and fluid dynamic transport from one set of filter elements onto and past the next lower set of filter elements.

During the operation of the pulse-jet cleaning means the larger, sloping surface or diagram 24 moves outward or away from the filter elements 32 in response to the increase in pressure within the dirty air chamber 22. This outward flexing is shown in broken lines in FIG. 2. As the pressure diminishes, the surface 24 flexes back to its normal position. As the particulate matter accumulates in the lowermost portion 25 upon the auger screw 68, it is removed, by the operation of the auger screw 68, to a location exterior the filter assembly. There is nearly zero dirty air velocity at the point adjacent to the auger screw, as a result of the dirty air inlet not being in nor even adjacent to the particulate matter collection area of the filter assembly.

Experimental

Figure 9:
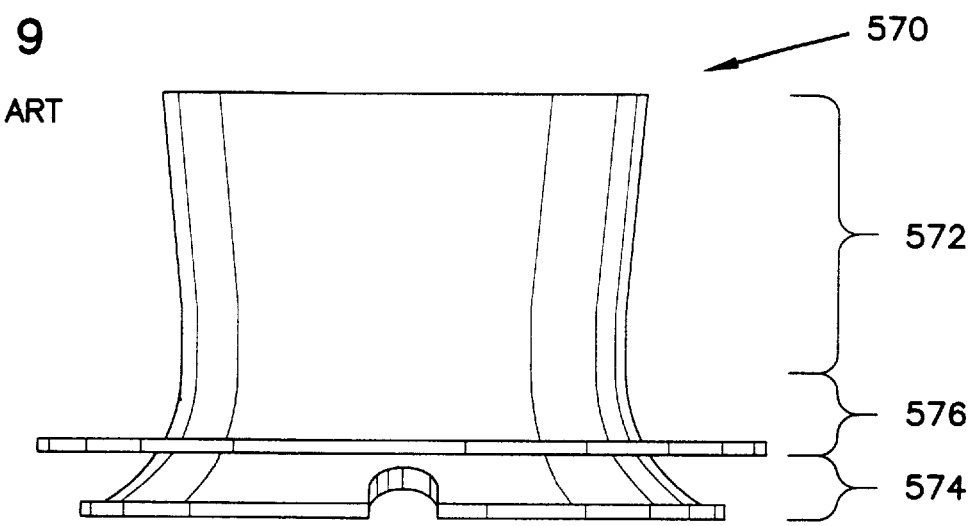
FIG. 9 is a side view of a prior art embodiment of a Venturi element.

The enhanced performance of the configuration described herein is illustrated by comparisons made with typical dust collector standard blow pipe configurations and with a typical Venturi element that does not have the specially contoured region 100 as described. Attention is directed to FIG. 9. In FIG. 9, a prior art Venturi element is shown at 570. The Venturi element shown at 570 may be one constructed in accordance with that described in U.S. Pat. No. 5,562,746 to Raether. Prior art Venturi element 570 includes diffuser portion 572, throat portion 576, and inlet portion 574. Throat portion 576 does not have the contoured region 100 as described herein. The diameter of the throat for the prior art Venturi element 570 is about 6.50 inches. The throat portion 576 is defined by a smooth curve being on a radius of about 1.5 inches. The diameter of the diffuser portion 572 at the outermost end is 8.44 inches. The radius of the portion between the inlet portion 574 and the throat portion 576 is 1.00 inch. The diameter of the end of the inlet portion 574 is 12.50 inches. The distance along the diffuser portion 572 between the throat and the end of the diffuser portion 572 is 8.55 inches, and angles at an angle of 6.5°.

Experimental measurements of pulse pressure made in locations where no dust accumulates on the filter elements 32 was found to have a pressure spike of 14 inches of water of differential pressure referenced to test day atmospheric pressure. Therefore, it was desired to find just the right combination that would result in at least spikes of 14 inches of water pressure differential along the entire length of the media 83.

To conduct the study, an Endevco miniature differential pressure transducer, model 8510B-2 was mounted within the filter elements 32. The back side of the differential transducer was vented to test day atmospheric pressure. This transducer was chosen for its small size, fast time response, and high sensitivity. Data were taken by a Nicolet Integra model 10 digital oscilloscope and sampled at 4000 samples per second. Measured voltage output was converted to pressure in inches of water, using the manufacturer's factory calibration. The tranducer was placed in a position within the first 5% of the length of the filter media 32 to the tube sheet 28.

1. Effect of Blow Pipe Distance

Figure 10:
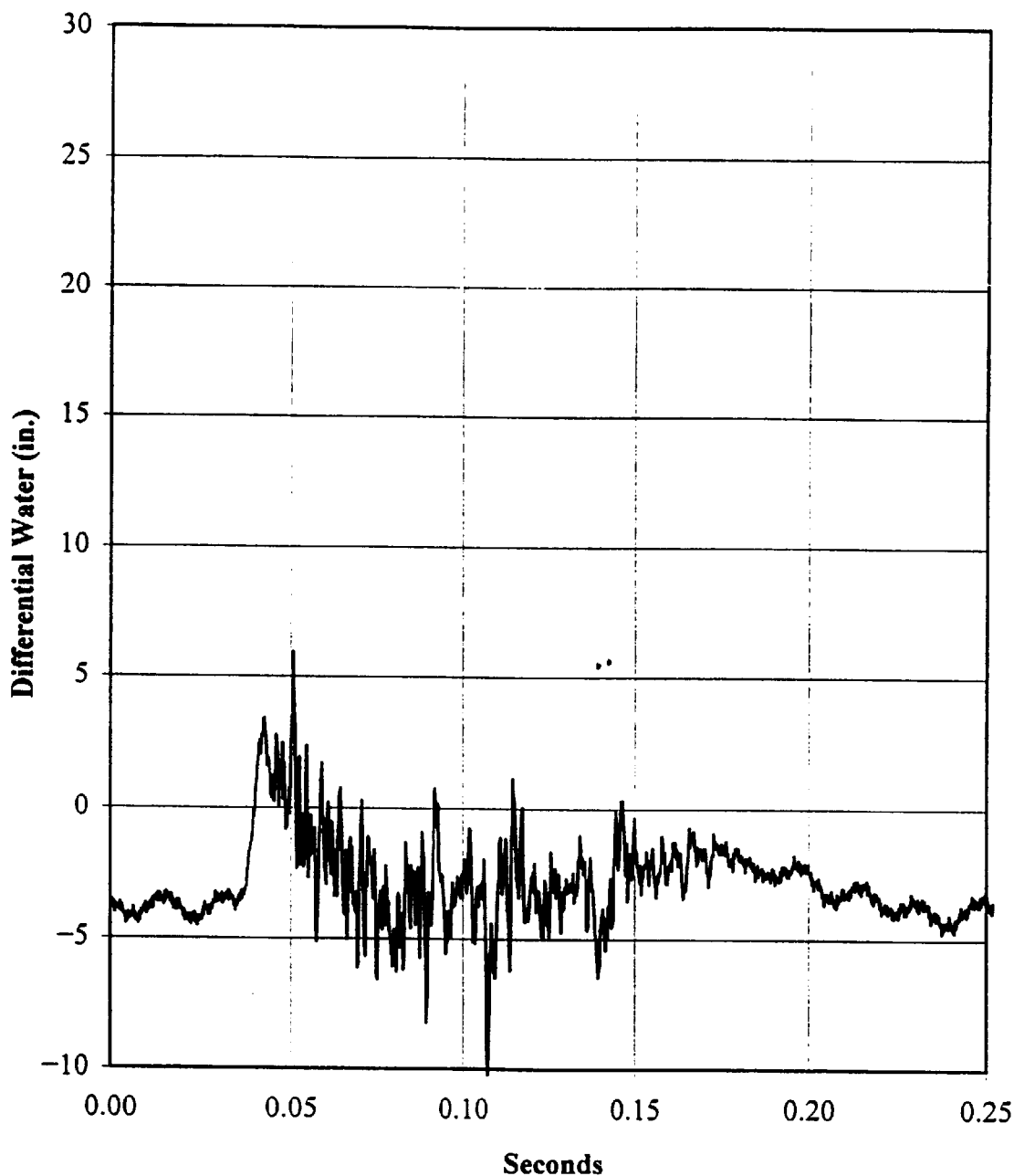
FIG. 10 is a graphical depiction of results of a test conducted utilizing the air filtration system of FIGS. 1–3 and with a standard blow pipe length.
Figure 11:
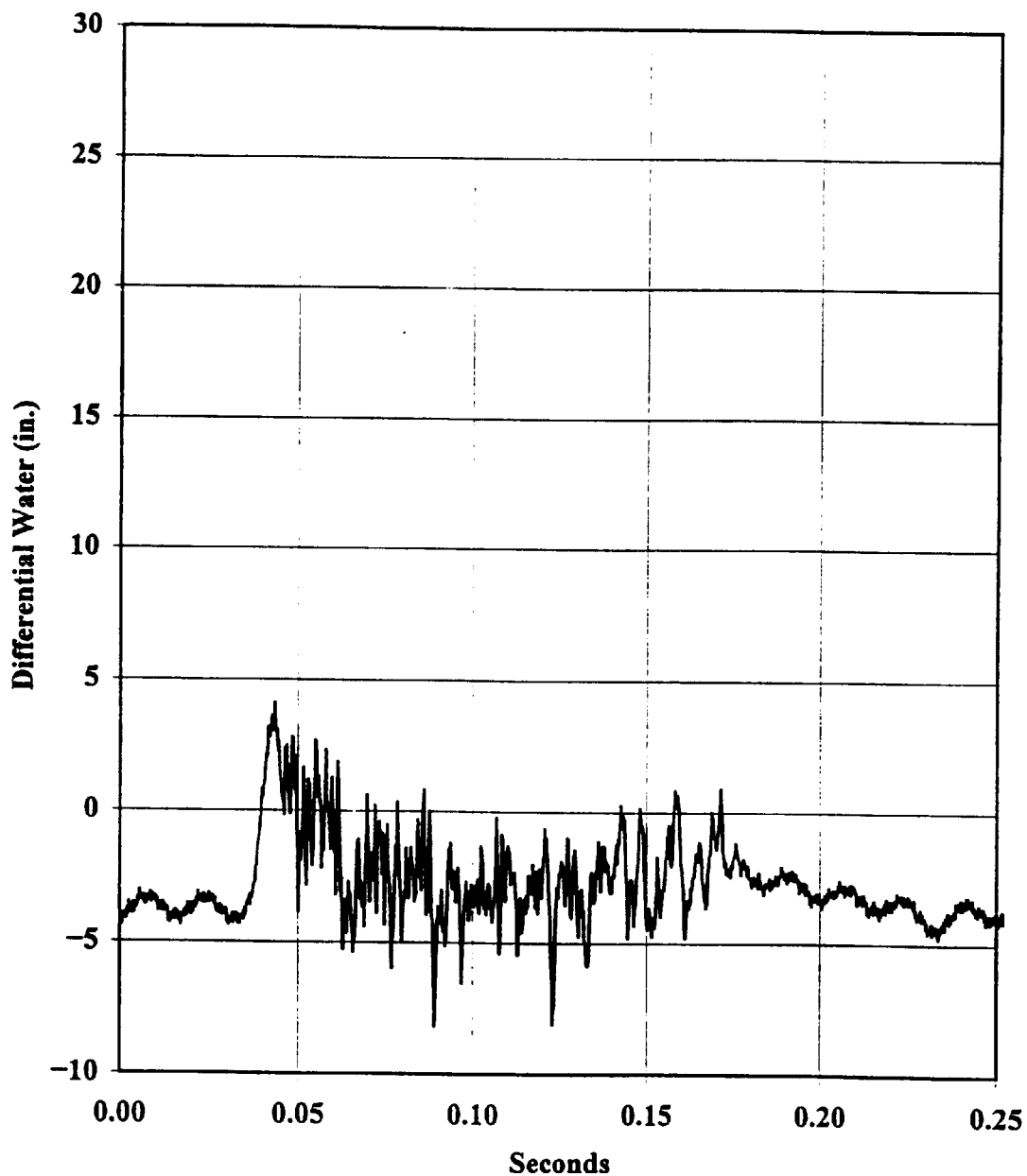
FIG. 11 is a graphical depiction of the results of a test conducted utilizing the prior art Venturi element of FIG. 9 in an air filtration system analogous to that shown in FIGS. 1–3 and with a standard blow pipe length.

The effect of adding a Venturi element while using a prior art blow pipe distance of 20.59 inches is shown in FIGS. 10 and 11. FIG. 10 shows the arrangement of the Venturi element 70 of the present invention used with a standard prior art distance from the blow pipe, that is a distance of 20.59 inches (the distance between the end of the blow pipe 97 and the base line 106, a distance analogous to distance "B" of FIG. 8). FIG. 11 shows the prior art Venturi element, such as that shown in FIG. 9 at 570 spaced from the blow pipe the standard prior art distance of 20.59 inches. As can be seen by comparing FIGS. 10 and 11, similar pulse pressure profiles result from these two configurations. Only 4 inches of water of differential pressure was produced at this location on the media 83 of the filter element 32. This illustrates that adding the Venturi 70, without modifying the distance from the blow pipe 97, will not increase the pulse pressure.

2. The Effect of Blow Pipe Distance

Figure 12:
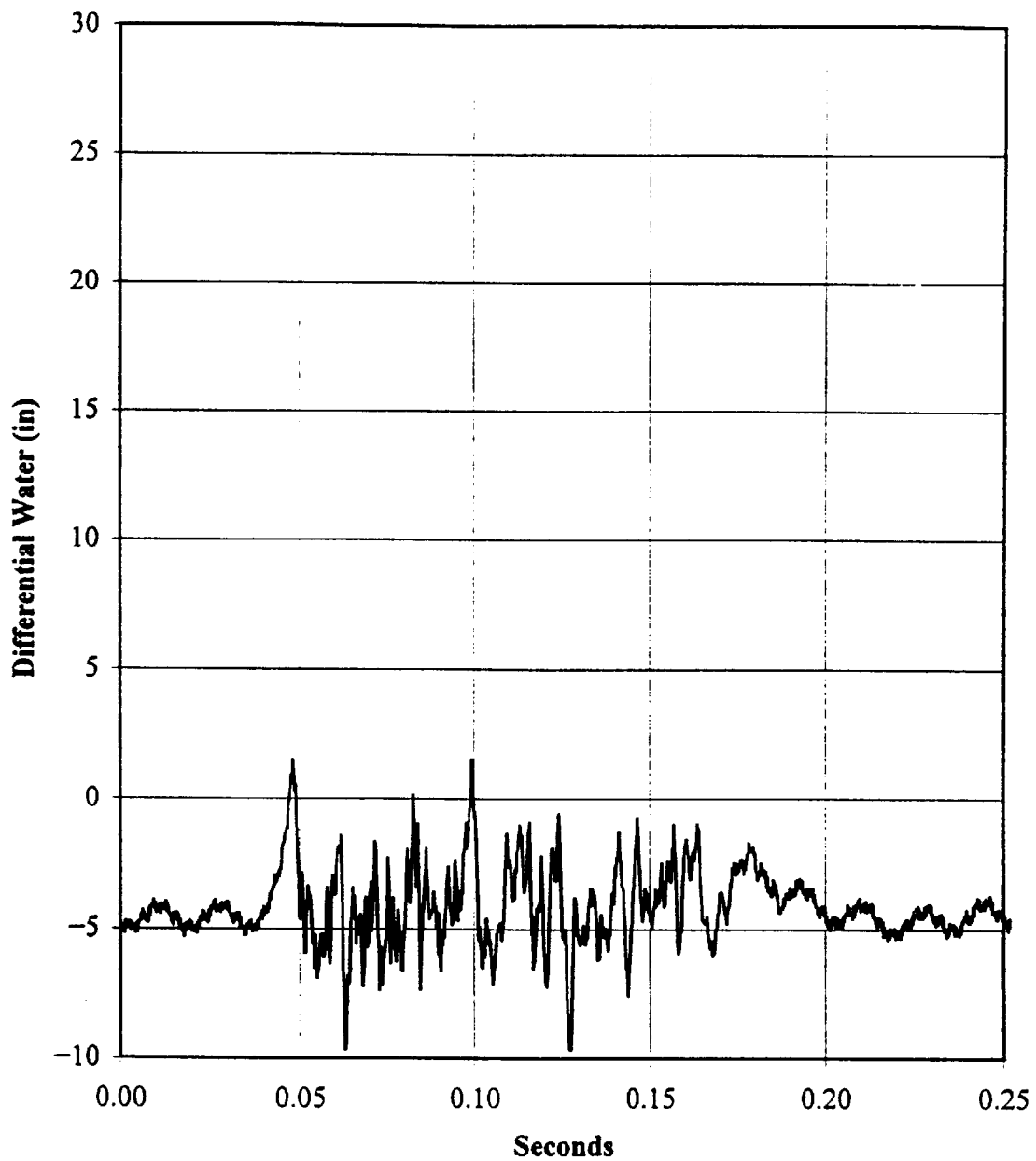
FIG. 12 is a graphical depiction of the results of a test conducted utilizing an air filtration system of the prior art with no Venturi element and with the prior art blow pipe length.
Figure 13:
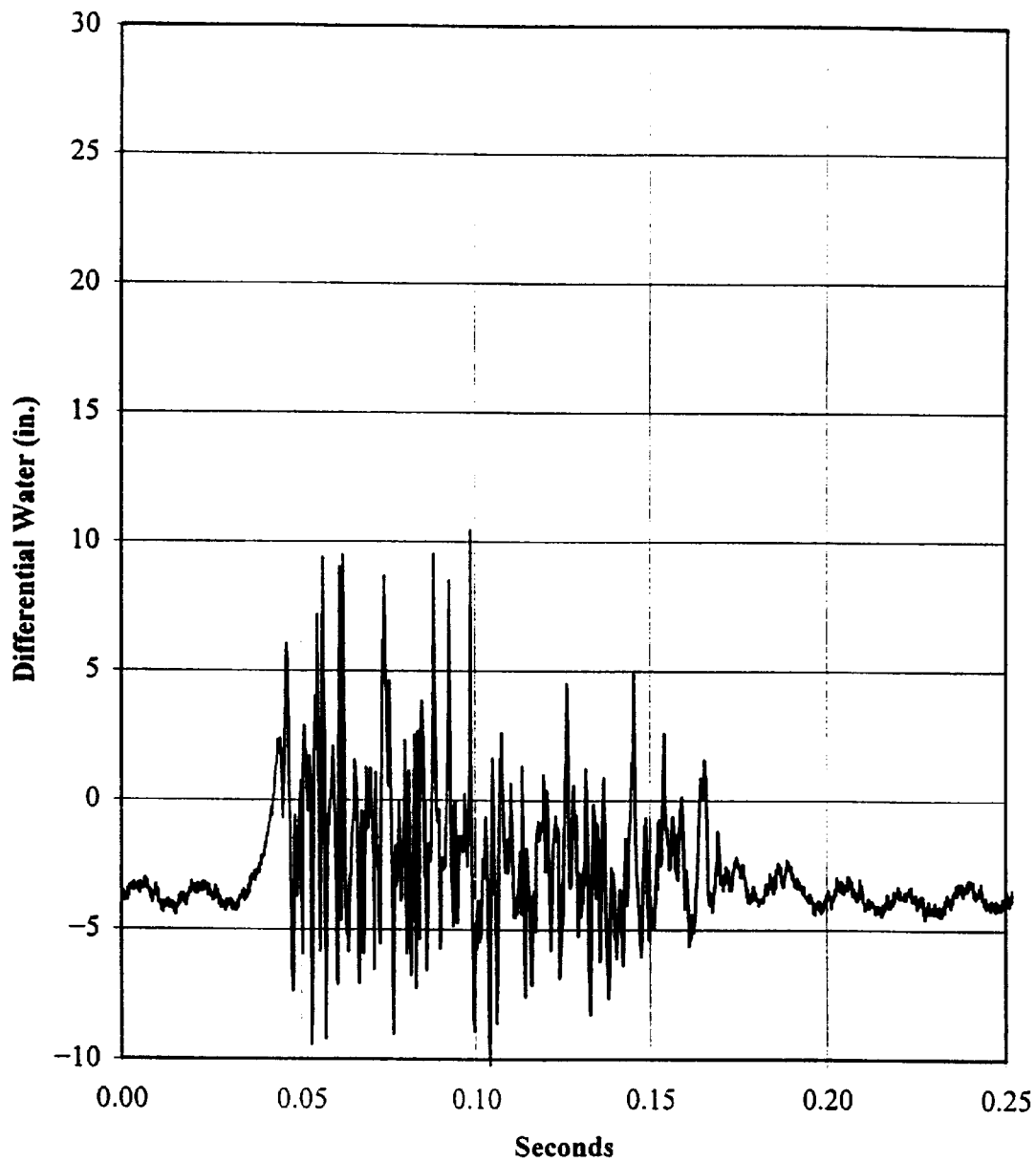
FIG. 13 is a graphical depiction of the results of a test of an air filtration utilizing no Venturi element and a modified blow pipe length according to the present invention.

The effect of modifying the blow pipe distance, without adding a Venturi, is shown in FIGS. 12 and 13. FIG. 12 illustrates a system that does not use a Venturi element at all, along with a prior art blow pipe distance of 20.59 inches. FIG. 13 shows a system that also does not use a Venturi at all, along with a new distance of 22.59 inches +/−0.5 inches (distance B of FIG. 8). As can be seen by comparing FIGS. 12 and 13, a noticeable difference in the pulse pressure profiles results from these two configurations, but still not an increase to the required 14 inches of water differential pressure. Only 2 inches of water of differential pressure was produced with the 20.59 inches of blow pipe distance, as shown in FIG. 12. In FIG. 13, the modified blow pipe distance shows random pressures spikes near 10 inches of water. This illustrates that modifying the blow pipe distance alone, without adding a Venturi element, does not increase the pulse pressure enough across the region of media 83 closest to the spacer wall 28.

3. Effect of Venturi Element Shape

Figure 14:
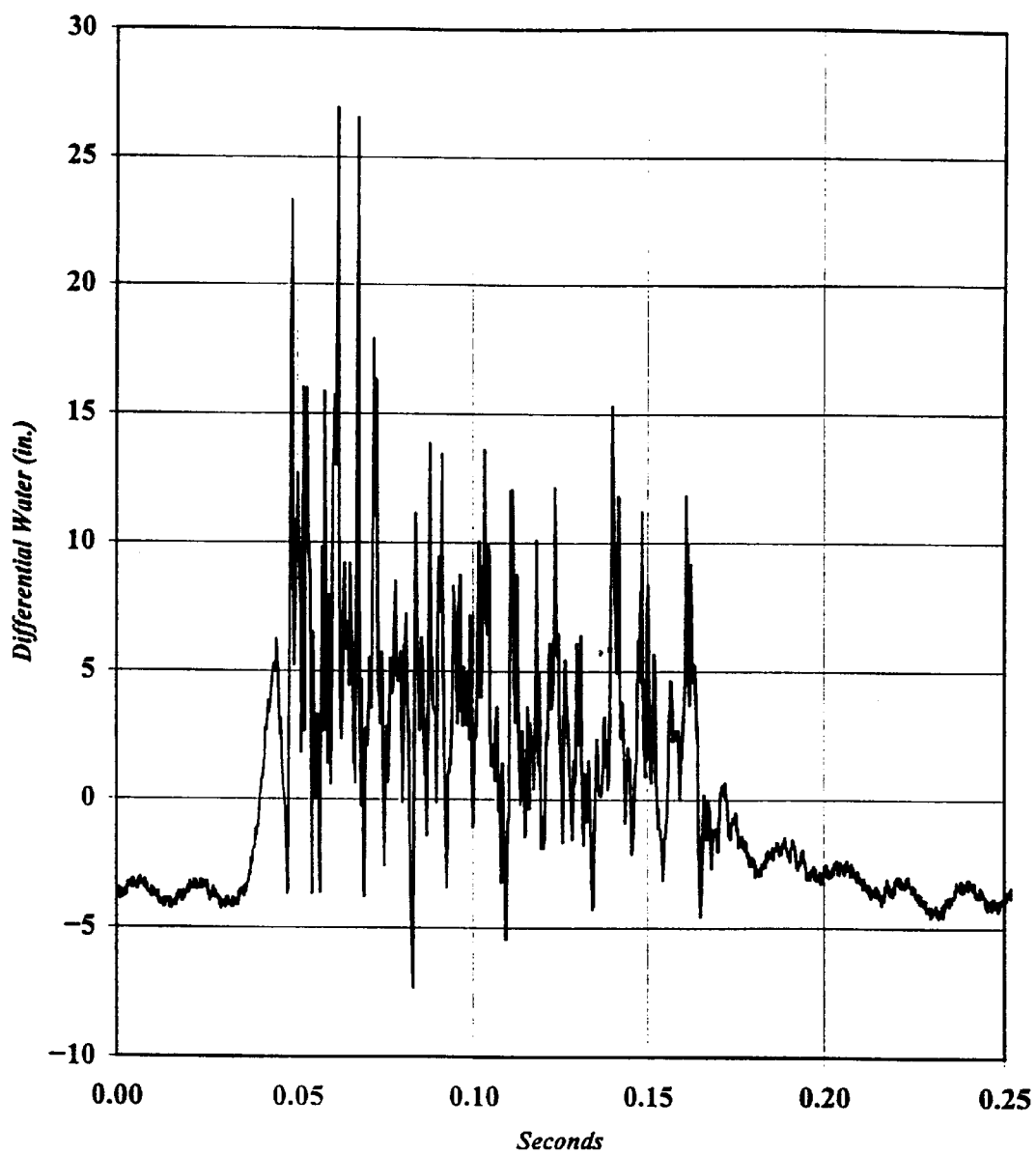
FIG. 14 is a graphical depiction of the results of a test utilizing the air filtration system of FIGS. 1–3 and the Venturi element of FIG. 5 and the modified blow pipe length, according to the present invention.
Figure 15:
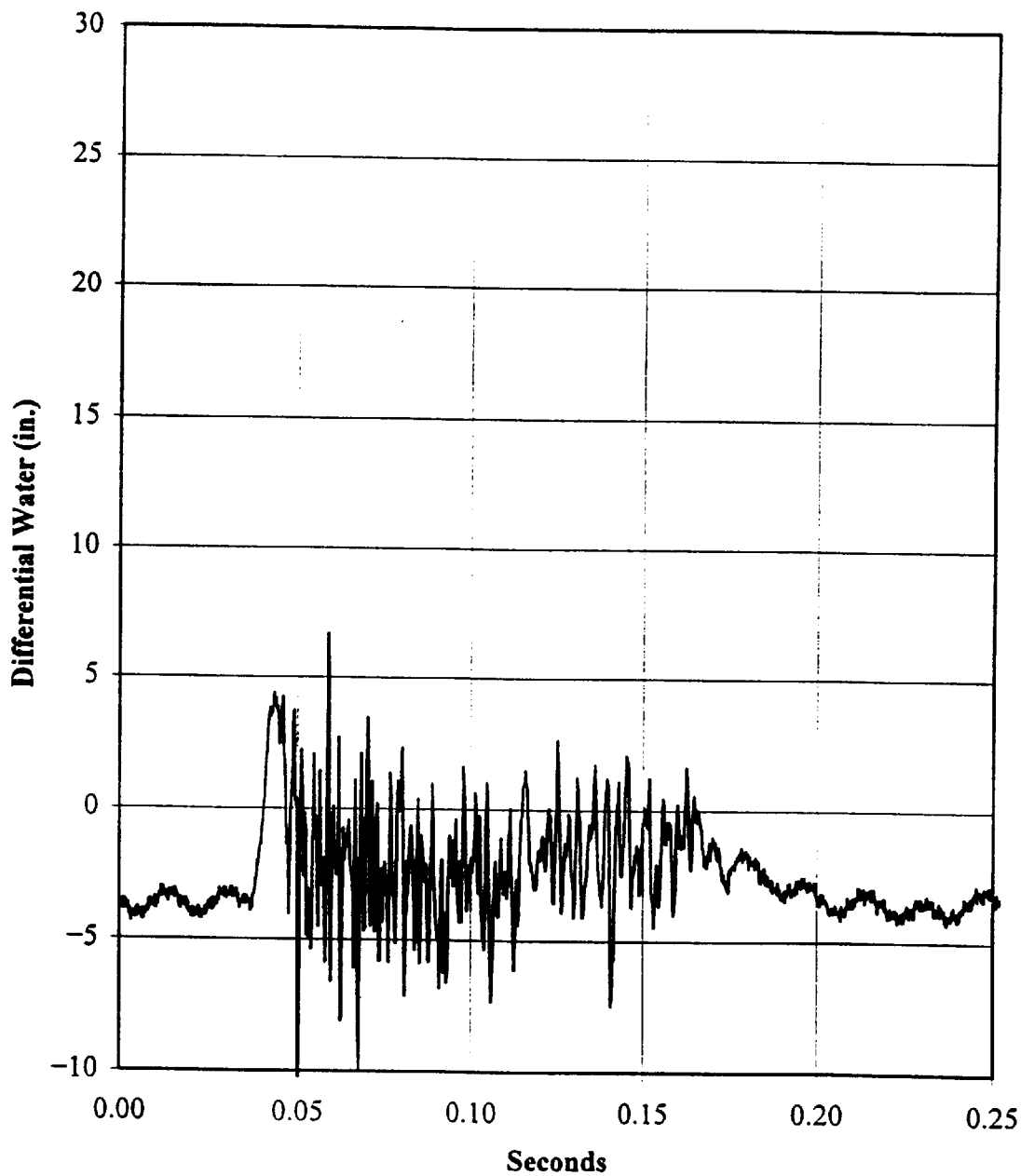
FIG. 15 is a graphical depiction of the results of a test conducted for an air filtration system utilizing the prior art Venturi element of FIG. 9 and with the modified blow pipe length according to the present invention.

The effect of adding a Venturi element with a specially contoured section 100 and having a modified blow pipe distance is shown in FIGS. 14 and 15. FIG. 14 shows the results of the Venturi element 70 according to the present invention and with a blow pipe distance of 22.59 inches; while FIG. 15 shows the prior art Venturi element 570 and with a blow pipe distance of 22.59 inches. As can be seen by comparing FIGS. 14 and 15, very different pulse pressure profiles result from these two configurations. The prior art Venturi 570 with a blow pipe distance of 22.59 inches nearly 5 inches of water of differential pressure. Compare this with the arrangement of the present invention, as shown in FIG. 14. Venturi element 70 having special contoured section 100 and with a blow pipe distance of 22.59 inches delivered numerous random pressure spikes near 15 inches of water of differential pressure, with three pressure spikes seen near 25 inches of water of differential pressure. This illustrates that adding a Venturi element 70 with a contoured section 100 and with a blow pipe distance of greater than 20.59, specifically 22.59 inches, increases the pulse pressure to the required value of 14 inches of water of differential pressure. That is, this illustrates that the system of the present invention provides a positive cleaning pressure differential along the entire length of the media 83. This is an improvement over the prior art that can only provide a positive cleaning pressure differential for about 75% of the length of the filter media, leaving the 25% nearest the tube sheet or spacer wall 28 clogged with dust.

We clam:

1. An air filter assembly comprising:
    (a) a housing including an air inlet, an air outlet, a wall separating said housing into a filtering chamber and a clean air chamber; said spacer wall including an air flow aperture therein;
    (b) a filter construction positioned in air flow communication with said air flow aperture, in said spacer wall; said filter construction including an extension of filter media defining a filter construction inner clean air chamber;
        (i) said filter construction being oriented with said filter inner clean air chamber in air flow communication with said spacer wall air flow aperture;
        (ii) said extension of filter media defining a longitudinal length along the filter construction;
    (c) a Venturi element mounted in said spacer wall air flow aperture and positioned to project into said filter construction inner clean air chamber; said Venturi element including an inlet portion and a throat portion;
    (d) a pulse-jet cleaning system including a blowpipe oriented to direct a pulse of air into said Venturi element from said clean air chamber and toward said filter construction, said blowpipe spaced a distance of greater than 20.6 inches from a base line of said Venturi element;
        (i) said blowpipe and said Venturi element being constructed and arranged to provide a positive cleaning pressure differential along greater than 75 percent of the length of said extension of filter media.

2. An air filter assembly according to claim 1 wherein:
    (a) said filter construction includes an end cap having a central aperture; said extension of filter media being embedded within said end cap.

3. An air filter assembly according to claim 2 wherein:
    (a) said Venturi element inlet portion projects into said filter construction end cap.

4. An air filter assembly according to claim 3 wherein:
    (a) said blowpipe is spaced a distance of about 22.6 inches from said Venturi element throat portion.

5. An air filter assembly according to claim 4 wherein:
    (a) said Venturi element throat portion includes a contoured section with first and second, opposite ends; said contoured section decreasing in diameter from said first end to said second end;
        (i) said contoured section having a length of about 3.0 inches;
        (ii) said first end having a diameter of about 6.828 inches;
        (iii) said second end having a diameter of about 6.510 inches.

6. An air filter assembly according to claim 5 wherein:
    (a) said inlet portion of said Venturi element defines a base line; said first end of said contoured section being spaced a distance of about 1.75 inches from said base line; said second end of said contoured section being spaced a distance of about 4.75 inches from said base line.

7. An air filter assembly according to claim 6 wherein:
    (a) said contoured section includes at least 9 regions between said first and second ends;
        (i) a first region being spaced a distance of about 1.75 inches from said base line and having a diameter of about 6.828 inches;
        (ii) a second region being spaced a distance of about 2.00 inches from said base line and having a diameter of about 6.764 inches,
        (iii) a third region being spaced a distance of about 2.25 inches from said base line and having a diameter of about 6.715 inches;
        (iv) a fourth region being spaced a distance of about 2.50 inches from said base line and having a diameter of about 6.672 inches;
        (v) a fifth region being spaced a distance of about 2.75 inches from said base line and having a diameter of about 6.638 inches;
        (vi) a sixth region being spaced a distance of about 3.00 inches from said base line and having a diameter of about 6.606 inches;
        (vii) a seventh region being spaced a distance of about 3.25 inches from said base line and having a diameter of about 6.576 inches;
        (viii) a eighth region being spaced a distance of about 3.50 inches from said base line and having a diameter of about 6.549 inches; and
        (ix) a ninth region being spaced a distance of about 3.75 inches from said base line and having a diameter of about 6.533 inches.

8. An air filter assembly according to claim 7 wherein:
    (a) said contoured section includes 12 regions between said first and second ends;
        (i) a tenth region being spaced a distance of about 4.00 inches from said base line and having a diameter of about 6.520 inches;
        (ii) an eleventh region being spaced a distance of about 4.25 inches from said base line and having a diameter of about 6.519 inches; and
        (iii) a twelfth region being spaced a distance of about 4.50 inches from said base line and having a diameter of about 6.512 inches.

9. An air filter assembly according to claim 8 wherein:
    (a) said blowpipe and said Venturi element are constructed and arranged to provide a positive cleaning pressure differential along at least 95 percent of the length of said extension of filter media.

10. An air filter assembly according to claim 9 wherein:
    (a) said Venturi element further includes a diffuser portion extending into said clean air chamber; said throat portion being between said inlet portion and said diffuser portion.

11. An air filter assembly according to claim 10 wherein:
(a) said diffuser portion defines a diameter of about 7.6 inches at an end portion thereof; and
(b) said diffuser portion is angled at least about 9 degrees from a vertical axis extending therethrough.

12. An air filter assembly according to claim 11 wherein:
(a) said filter construction includes first and second filter elements in axial alignment;
   (i) said extension of media comprising a first extension of media in said first filter element and a second extension of media in said second filter element.

13. An air filter assembly according to claim 12 wherein:
(a) said spacer wall includes a second air flow aperture therein; and wherein the assembly further includes:
(b) a second filter construction positioned in air flow communication with said second air flow aperture in said spacer wall; said second filter construction including an extension of filter media defining a second filter construction inner clean air chamber;
   (i) said second filter construction being oriented with said second filter inner clean air chamber in air flow communication with said spacer wall second air flow aperture;
   (ii) said second filter construction extension of filter media defining a longitudinal length along the second filter construction;
(c) a second Venturi element mounted in said spacer wall second air flow aperture and positioned to project into said second filter construction inner clean air chamber; said second Venturi element including an inlet portion and a throat portion;
(d) a second blowpipe oriented to direct a pulse of air into said second Venturi element from said clean air chamber and toward said second filter construction;
   (i) said second blowpipe and said second Venturi element being constructed and arranged to provide a positive cleaning pressure differential along at least 95 percent of the length of said second filter construction extension of filter media.

14. An air filter assembly according to claim 13 wherein:
(a) said second blowpipe is spaced a distance of about 22.6 inches from a base line of said second Venturi element.

15. An air filter assembly according to claim 14 wherein:
(a) said second Venturi element throat portion includes a contoured section with first and second, opposite ends; said second Venturi element contoured section decreasing in diameter from said second Venturi element contoured section first end to said second Venturi element contoured section second end;
   (i) said second Venturi element contoured section having a length of about 3.0 inches;
   (ii) said second Venturi element contoured section first end having a diameter of about 6.828 inches; and
   (iii) said second Venturi element contoured section second end having a diameter of about 6.512 inches.

16. A Venturi element comprising:
(a) an inlet portion;
(b) a diffuser portion; and
(c) a throat portion coterminous with said inlet portion and said diffuser portion; said throat portion having a contoured section with a first end and a second end;
   (i) said contoured section comprising a plurality of continuous regions decreasing in diameter from said first end to said second end;
   (ii) said second end defining a continuous and non-differentiable point between said contoured section and said diffuser portion.

17. A Venturi element according to claim 16 wherein:
(a) said inlet portion of said Venturi element defines a base line;
   (i) said first end of said contoured section being spaced a distance of about 1.75 inches from said base line;
   (ii) said second end of said contoured section being spaced a distance of about 4.75 inches from said base line;
   (iii) said contoured section having a length of about 3.0 inches;
   (iv) said first end having a diameter of about 6.828 inches; and
   (v) said second end having a diameter of about 6.510 inches.

18. A Venturi element according to claim 17 wherein:
(a) said contoured section includes at least 12 regions between said first and second ends;
   (i) a first region being spaced a distance of about 1.75 inches from said base line and having a diameter of about 6.828 inches;
   (ii) a second region being spaced a distance of about 2.00 inches from said base line and having a diameter of about 6.764 inches;
   (iii) a third region being spaced a distance of about 2.25 inches from said base line and having a diameter of about 6.715 inches;
   (iv) a fourth region being spaced a distance of about 2.50 inches from said base line and having a diameter of about 6.672 inches;
   (v) a fifth region being spaced a distance of about 2.75 inches from said base line and having a diameter of about 6.638 inches; and
   (vi) a sixth region being spaced a distance of about 3.00 inches from said base line and having a diameter of about 6.606 inches;
   (vii) a seventh region being spaced a distance of about 3.25 inches from said base line and having a diameter of about 6.576 inches;
   (viii) an eighth region being spaced a distance of about 3.50 inches from said base line and having a diameter of about 6.549 inches;
   (ix) a ninth region being spaced a distance of about 3.75 inches from said base line and having a diameter of about 6.533 inches;
   (x) a tenth region being spaced a distance of about 4.00 inches from said base line and having a diameter of about 6.520 inches;
   (xi) an eleventh region being spaced a distance of about 4.25 inches from said base line and having a diameter of about 6.519 inches; and
   (xii) a twelfth region being spaced a distance of about 4.50 inches from said base line and having a diameter of about 6.512 inches.

19. A method of cleaning a filter element comprising:
(a) discharging a quantity of pressurized air from a blow-pipe spaced a distance greater than 20.6 inches from a base line of a Venturi element into a Venturi element in airflow communication with a filter element to provide a positive cleaning pressure differential along greater than 95 percent of a length of the filter element.

* * * * *